US007945243B2

(12) United States Patent
Kim

(10) Patent No.: US 7,945,243 B2
(45) Date of Patent: May 17, 2011

(54) MOBILE COMMUNICATION TERMINAL FOR PROTECTING PRIVATE CONTENTS AND METHOD FOR CONTROLLING THE SAME

(75) Inventor: Hyoung-Soo Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 1087 days.

(21) Appl. No.: 10/913,047

(22) Filed: Aug. 6, 2004

(65) Prior Publication Data

US 2005/0075092 A1    Apr. 7, 2005

(30) Foreign Application Priority Data

Oct. 7, 2003  (KR) .......................... 10-2003-0069670

(51) Int. Cl.
*H04M 1/66*    (2006.01)
(52) U.S. Cl. ........ 455/411; 455/409; 455/410; 455/461; 455/463; 455/558
(58) Field of Classification Search .................. 455/558, 455/461, 551, 409–411, 463
See application file for complete search history.

(56) References Cited

U.S. PATENT DOCUMENTS

| | | | | |
|---|---|---|---|---|
| 5,933,773 A | * | 8/1999 | Barvesten | 455/411 |
| 5,940,773 A | * | 8/1999 | Barvesten | 455/558 |
| 6,138,005 A | * | 10/2000 | Park | 455/558 |
| 6,463,300 B1 | * | 10/2002 | Oshima | 455/558 |
| 2002/0165008 A1 | * | 11/2002 | Sashihara et al. | 455/558 |
| 2002/0169004 A1 | * | 11/2002 | Thil et al. | 455/558 |
| 2003/0114191 A1 | * | 6/2003 | Nishimura | 455/557 |
| 2004/0005912 A1 | * | 1/2004 | Hubbe et al. | 455/558 |
| 2005/0020308 A1 | * | 1/2005 | Lai | 455/558 |

FOREIGN PATENT DOCUMENTS

| | | |
|---|---|---|
| EP | 0785634 A2 | 12/1996 |
| EP | 1 107 627 | 6/2001 |
| EP | 1 469 692 | 10/2004 |
| JP | 2002-199089 | 7/2002 |
| KR | 1020000022051 A | 4/2000 |
| WO | WO97/49256 | 12/1997 |
| WO | WO 02/078282 | * 10/2002 |

* cited by examiner

*Primary Examiner* — Michael T Thier
*Assistant Examiner* — Shantell Heiber
(74) *Attorney, Agent, or Firm* — The Farrell Law Firm, P.C.

(57) ABSTRACT

A mobile terminal for use in a Global System for Mobile communication (GSM) system. A mobile equipment (ME) for use in the GSM system includes a Subscriber Identity Module (SIM) card and a Mobile Terminal (MT). The SIM card stores International Mobile Subscriber Identity (IMSI) information used for subscriber authentication and private information. The MT stores the IMSI and private information of a user, and contains a controller, which reads IMSI information from the SIM card when the SIM card is inserted into the MT, and denies access to the stored private information when the read IMSI information of the inserted SIM card is different from the stored IMSI information.

6 Claims, 7 Drawing Sheets

MOBILE COMMUNICATION TERMINAL FOR PROTECTING PRIVATE CONTENTS AND METHOD FOR CONTROLLING THE SAME

This application claims priority to an application entitled "MOBILE COMMUNICATION TERMINAL FOR PROTECTING PRIVATE CONTENTS AND METHOD FOR CONTROLLING THE SAME", filed in the Korean Intellectual Property Office on Oct. 7, 2003 and assigned Serial No. 2003-69670, the contents of which are hereby incorporated by reference.

BACKGROUND OF THE INVENTION

1. Field of the Invention

The present invention relates to a Global System for Mobile communication (GSM) terminal, and more particularly to an apparatus and method for protecting private contents including a primary user's personal information, from unauthorized or secondary users in the GSM terminal.

2. Description of the Related Art

A GSM communication system is a digital mobile phone system widely used in Europe and other countries. GSM Mobile Equipment (hereinafter referred to as an ME) for use in the GSM system is implemented by connecting a GSM Mobile Terminal (hereinafter referred to as an MT) to a Subscriber Identity Module (SIM) card. The SIM card includes information associated with a subscriber ID such as an International Mobile Subscriber Identity (IMSI) and a unit for performing subscriber authentication. The SIM card stores a variety of contents of the primary GSM user, for example, phone book data, short message service (SMS) messages, etc.

The GSM communication system provides a SIM lock function. The SIM lock function reads IMSI contents from among SIM contents to prevent the GSM communication system from being used illegally, and associates the SIM with a specific MT. More specifically, in situations where a primary user's MT is stolen or an unauthorized secondary user attempts to use the primary user's MT, the primary user can lock his or her MT using the SIM lock function to completely prevent the secondary user from using the primary user's MT without authorization. The SIM lock function prevents people other than the primary user from using some functions of the primary user's MT (except an emergency call function) without receiving the primary user's permission. The MT requires a password to release the SIM lock function. Otherwise, if the MT is not supplied with the password, it must receive a SIM card from the user serving as the MT's true owner such that it is enabled to serve as a mobile terminal.

As stated above, the SIM lock function of the conventional GSM ME is adapted to prevent an MT of a primary user from being unfairly used by a secondary user by means of other SIM cards. However, the primary user may lend his or her MT to some other person or secondary user to allow the other person to use the primary user's MT using the other person's SIM card, or the primary user may deposit his or her MT at an after-sale service (AS) center to have his or her MT repaired. In this case, the SIM lock function is far from efficient, such that the primary user's personal or private contents are unavoidably exposed to others even though the primary user wishes not to expose the personal or private contents to the others. In other words, when a friend or a colleague of the primary user, or an engineer working for the AS center insert their SIM cards, instead of the primary user's SIM card, into the primary user's MT, private contents or function setup data stored in the primary user's MT may be unavoidably exposed without any restriction.

SUMMARY OF THE INVENTION

Therefore, the present invention has been made in view of the above problems, and it is an object of the present invention to provide a mobile terminal (MT) and a method for controlling the same, which can prevent private contents and function setup information of a primary user from being exposed to others even though the primary user has permitted others to use his or her mobile terminal.

In accordance with the present invention, the above and other objects can be accomplished by the provision of a mobile equipment (ME) apparatus for use in a Global System for Mobile communication (GSM) system, comprising: a Subscriber Identity Module (SIM) card for storing International Mobile Subscriber Identity (IMSI) information used for subscriber authentication and private information; and a Mobile Terminal (MT) for storing the IMSI and private information of a primary user, and containing a controller which reads IMSI information from the SIM card when the SIM card is inserted into the MT, and denies access to the stored private information when the read IMSI information of the inserted SIM card is different from the stored IMSI information.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
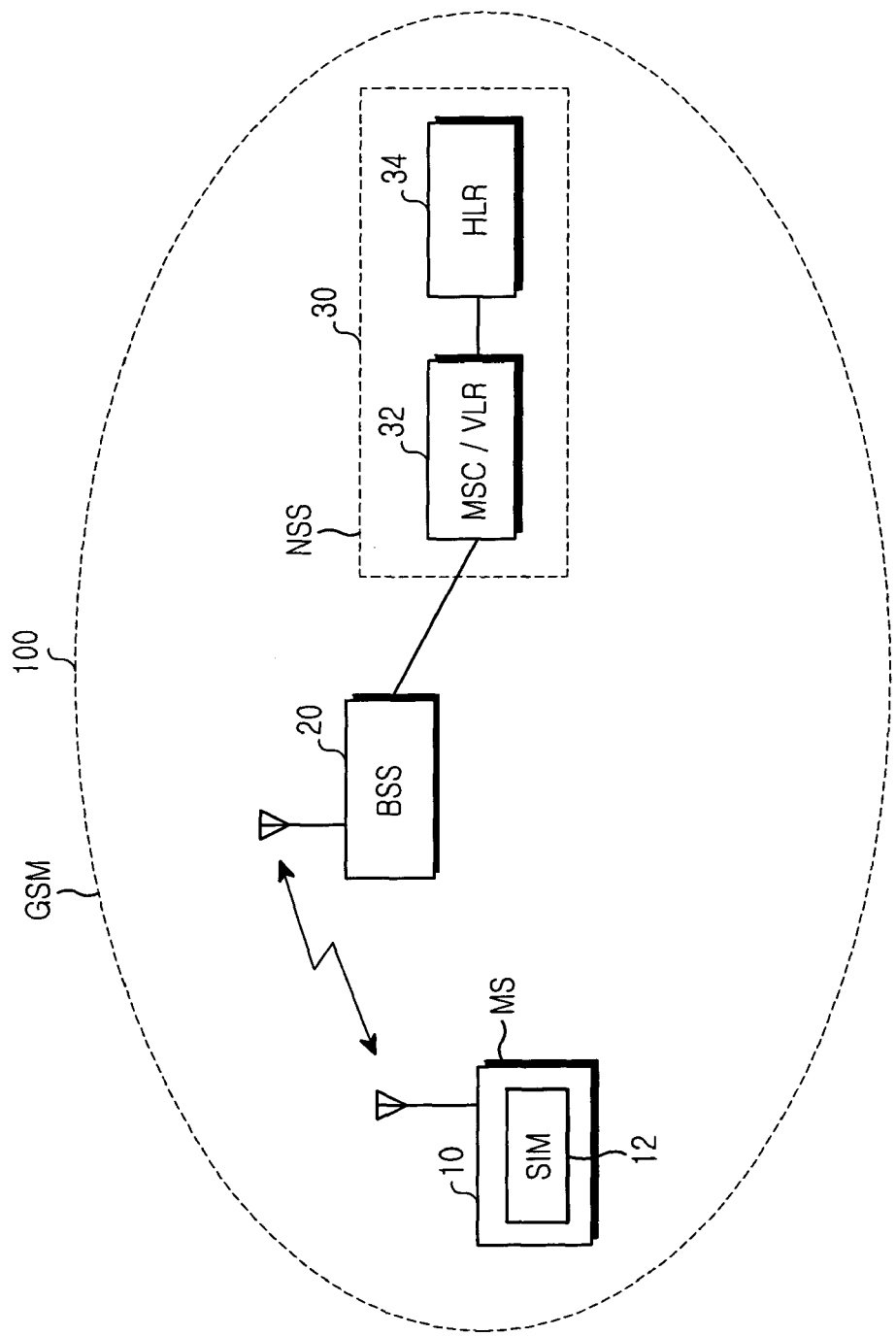
FIG. 1 is a block diagram illustrating a conventional GSM system.

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention rather unclear.

FIG. 1 is a block diagram illustrating a conventional Global System for Mobile communication (GSM) system. Referring to FIG. 1, the GSM system 100 includes a Base Station Subsystem (BSS) 20 and a Network Subsystem (NSS) 30. The BSS 20 wirelessly communicates with a Mobile Station (MS) 10. The BSS 20 is connected to a Mobile Switching Center (MSC) 32 of the NSS 30. The MSC 32 performs switching of calls generated from the MS, and is connected to other communication networks such as a PSTN (Public Switched Telephone Network) to perform switching of calls generated from the other communication networks. The NSS 30 includes an HLR (Home Location Register) 34 for storing subscriber information of all the subscribers contained in the GSM communication network. The NSS 30 includes a VLR (Visitor Location Register) 32. Subscriber information of the MS 10 is stored in the VLR 32 of the MSC associated with the MS 10's current location.

The MS 10 includes a SIM card 12. The SIM card stores subscriber ID information such as an IMSI, such that a subscriber can be identified by the SIM card 12.

Figure 2:
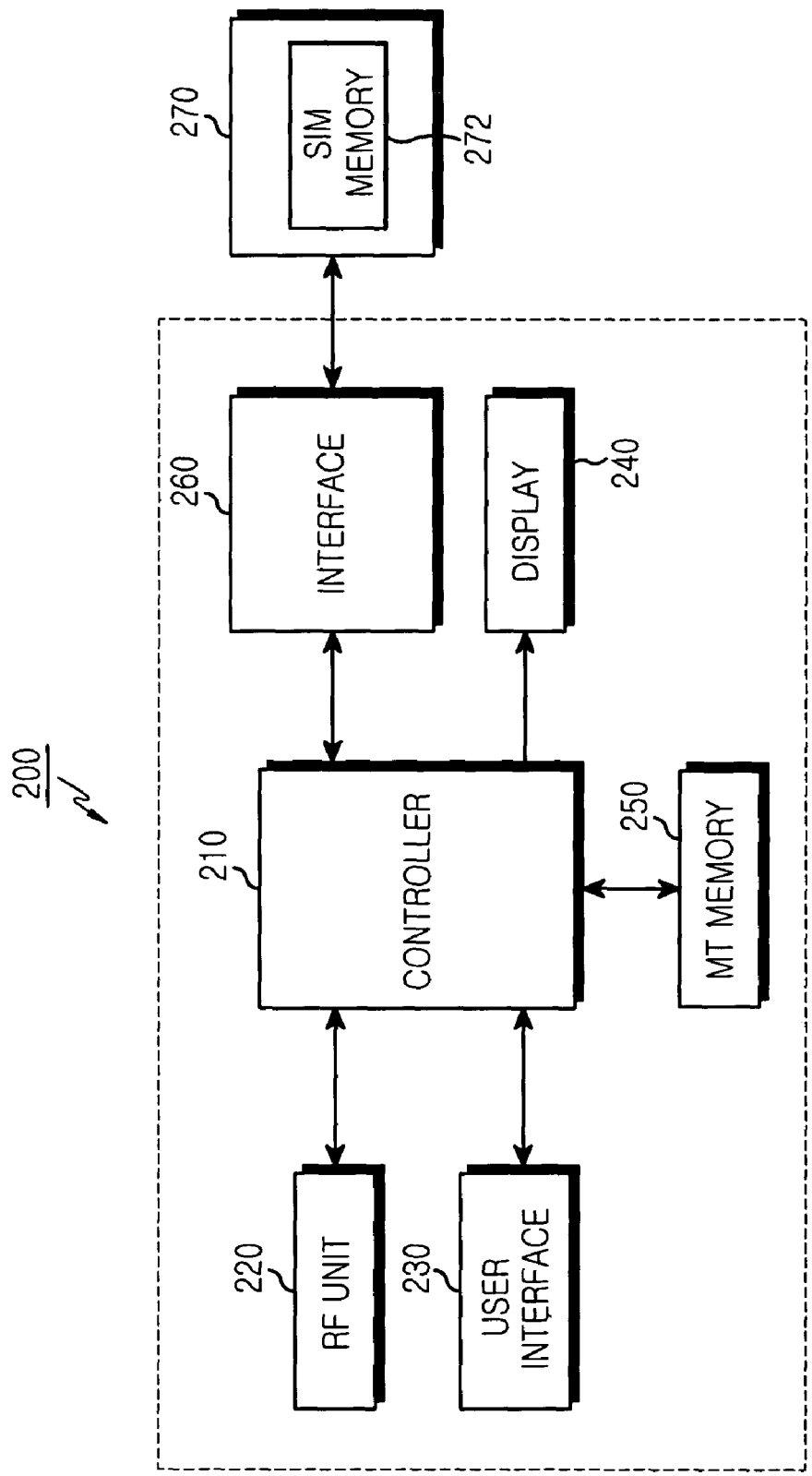
FIG. 2 is a block diagram illustrating a mobile terminal (MT) in accordance with a preferred embodiment of the present invention.

FIG. 2 is a block diagram illustrating a mobile terminal (MT) in accordance with a preferred embodiment of the present invention. Referring to FIG. 2, the MS includes a mobile terminal 200 and a SIM card 270. The SIM card 270 includes a SIM memory for storing subscriber ID information such as an IMSI and private contents (also called personal information) such as phone book and SMS message information, etc.

The mobile terminal (MT) 200 includes a controller 210, an RF unit 220, a user interface 230, a display 240, an MT memory 250, and an interface 260. The controller 210 controls overall operations of the MT 200. If the SIM card 270 is inserted into the MT 200, the controller 210 reads the IMSI from the SIM memory 272 to determine whether the currently inserted SIM card is equal to the IMSI stored in the MT memory 250 of the MT 200. If it is determined that the IMSI stored in the MT memory 250 is different from the IMSI stored in the SIM card 270 and a privacy lock function is established by a primary user, the controller 210 of the MT 200 denies access to privacy information such as private contents and function setup information stored in the MT 200.

The MT memory 250 may include a plurality of memories for storing a plurality of programs and data needed to control operations of the MT 200, for example, a Read Only Memory (ROM), a Random Access Memory (RAM), an audio memory, etc. The MT memory 250 stores phone book data and SMS messages. The MT memory 250 stores electronic diary contents such as a scheduler, function setup data established by a variety of users, and a variety of contents downloaded or entered by the users. In this case, the function setup data established by the users may be composed of a variety of contents, for example, alarm function setup contents, and wake-up call contents, etc. If the privacy lock function is established by the primary user, the MT memory 250 stores the IMSI of the currently inserted SIM card. In this case, the SIM memory 272 of the SIM card 270 and the MT memory 250 of the MT 200 may have the same memory contents. If a current user of the MT 200 is different from the SIM card's owner or primary user, the MT and SIM memories 250 and 272 may have different memory contents therebetween.

Upon receiving a control signal from the controller 210, the RF unit 220 controls communication operations of audio, text, and control data. The user interface 230 is composed of a plurality of number keys and a plurality of function keys, and outputs entry data corresponding to the user-selected key signal to the controller 2 10. The user interface 210 may be configured in the form of a general key matrix or a touch screen. If the user interface 210 is implemented through the touch screen, number keys, function keys and arrow keys contained in the touch screen are freely selected or entered by a user using a variety of entry tools such as a stylus pen, etc. The display 240 displays a variety of messages upon receiving a control signal from the controller 10. The display 240 may be comprised of a Liquid Crystal Display (LCD), a Thin Film Transistor (TFT), an Organic Electroluminescence (EL), etc.

Figure 3:
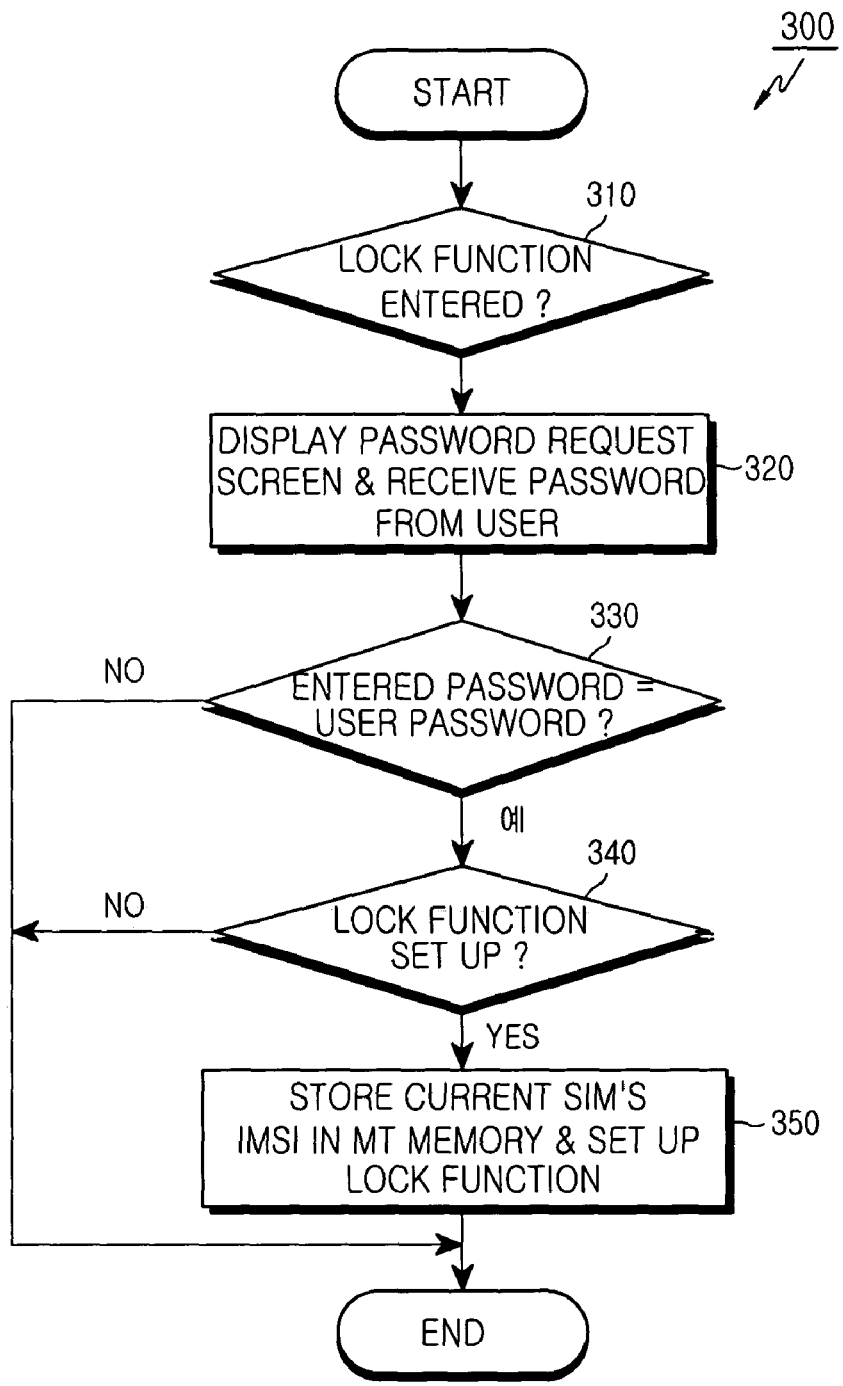
FIG. 3 is a flow chart illustrating a method for establishing a privacy lock mode in accordance with a preferred embodiment of the present invention.
Figure 4:
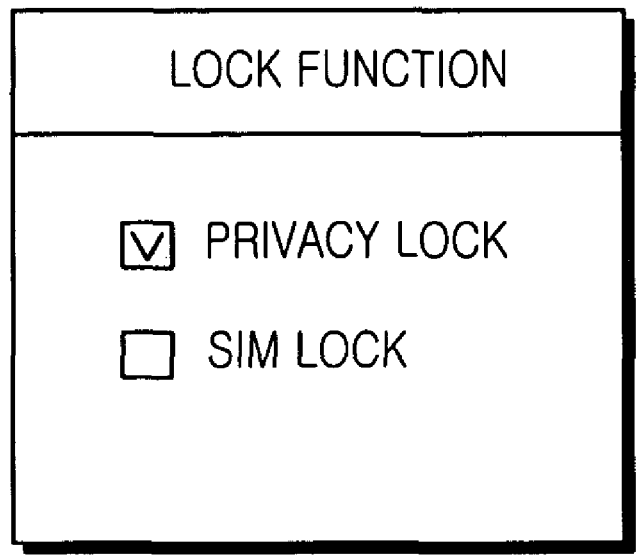
FIG. 4 is a view illustrating the appearance of an exemplary image screen used for selecting the privacy lock mode in accordance with a preferred embodiment of the present invention.

FIG. 3 is a flow chart illustrating a method for establishing a privacy lock mode in accordance with a preferred embodiment of the present invention. FIG. 4 is a view illustrating the appearance of an exemplary image screen used for selecting the privacy lock mode in accordance with a preferred embodiment of the present invention.

Referring to FIGS. 2 and 4, the controller 210 of the MT 200 determines whether a primary user has selected a privacy lock function at step S310. If the primary user has selected the privacy lock function at step 310, the controller 210 displays a password entry request screen on the display 240 for the primary user's recognition, and receives the password from the primary user at step 320. This password enables the primary user or the user corresponding to the MT 200's true owner to set up the privacy lock function. The controller 210 determines whether the password entered by the current user is the same as or equal to a prestored primary user's password at step 330. If it is determined that the password entered by the current user is the same as or equal to the prestored user's password, the controller 210 enables the current user to view an exemplary screen image used for selecting the privacy lock function. Further, at step 340, the controller 210 determines whether the current user selects the privacy lock function on the exemplary screen image.

FIG. 4 is a view illustrating the appearance of the exemplary image screen used for selecting the privacy lock function. The primary user can select a desired lock function on the screen image shown in FIG. 4. The SIM lock function is well known in the art, and prevents people other than the primary user from using the primary user's MT without authorization. The privacy lock function prevents other people from gaining access to the primary user's private contents. If the primary user selects a prescribed lock function, the controller 210 stores an IMSI of the current SIM card in the MT memory 250, and sets up the selected lock function at step 350. Operations of the MT when the lock function is set up will hereinafter be described with reference to FIG. 5.

Figure 5:
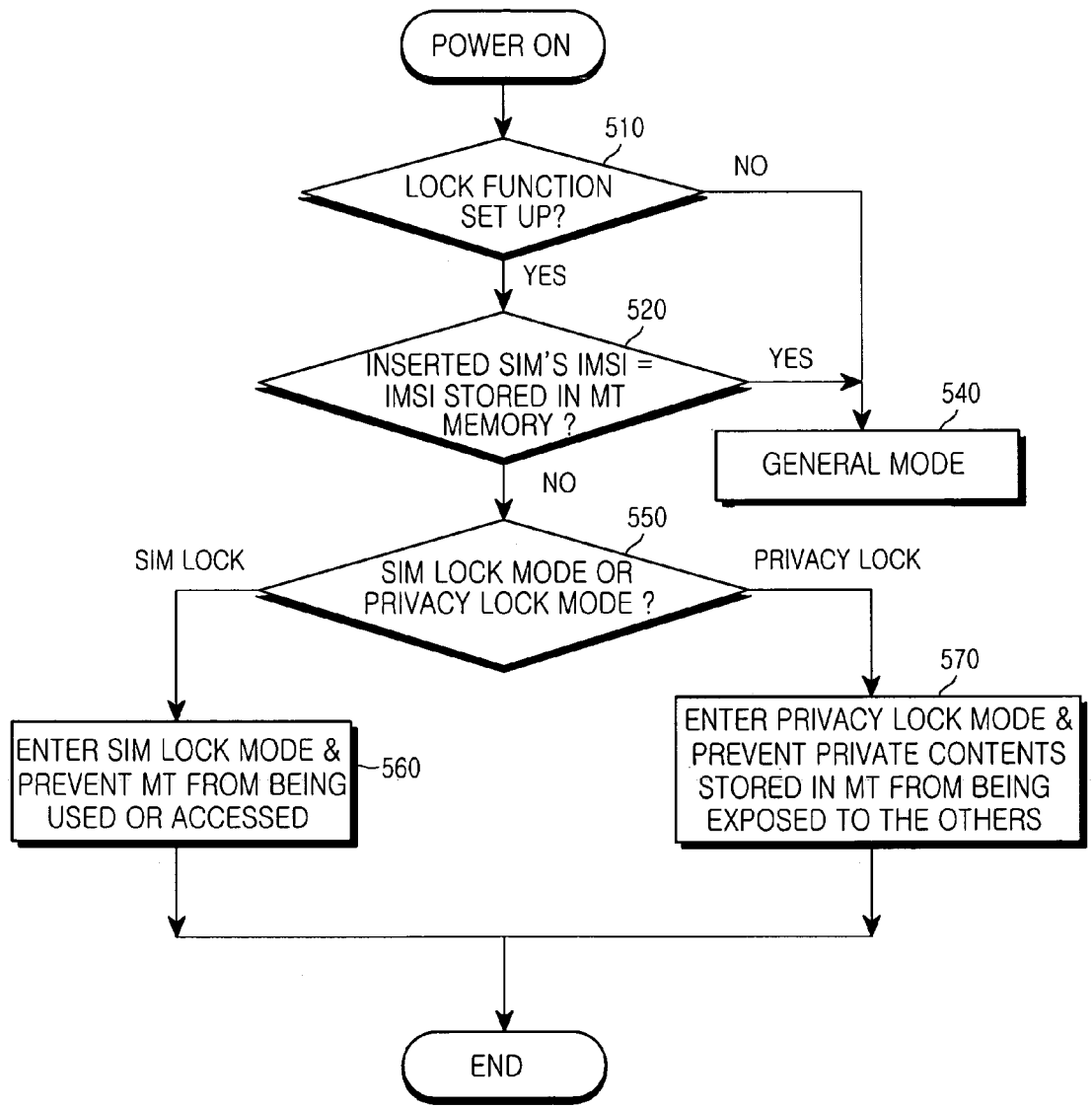
FIG. 5 is a flow chart illustrating a method for controlling the MT in the case of the privacy lock mode in accordance with a preferred embodiment of the present invention.

FIG. 5 is a flow chart illustrating a method for controlling the MT in the case of the privacy lock mode in accordance with a preferred embodiment of the present invention.

Referring to FIGS. 2 and 5, if the MT 200 is powered on, the controller 210 of the MT 200 determines whether a lock function is set up at step 510. There are two kinds of lock functions, i.e., a privacy lock function, and a SIM lock function. If it is determined that the lock function is set up, the controller 210 determines whether the IMSI of the currently inserted SIM card is equal to that of the MT memory 250 at step 520. If it is determined that the IMSI of the SIM card is equal to that of the MT memory 250, the controller 210 performs general operations at step 540. Otherwise, if it is determined that the IMSI of the SIM card is different from that of the MT memory 250, the controller 210 determines whether the setup lock function is the SIM lock function or the privacy lock function at step 550. If it is determined that the setup lock function is equal to the SIM lock function, the controller 210 enters the SIM lock mode at step 560, such that it prevents the MT 200 from being used or accessed by other people.

If it is determined that the setup lock function is equal to the privacy lock function, the controller 210 enters the privacy lock mode at step 570, such that it prevents private contents stored in the MT memory 250 of the MT 200 from being exposed to other people. In more detail, in the case of the privacy lock mode, the controller 210 enables the current user to add, delete, and read phone book data and SMS messages stored only in the SIM memory 272 of the currently inserted SIM card. In other words, the secondary user cannot gain access to the phone book or SMS message box of the MT memory 250. The controller 210 prevents the secondary user from gaining access to an electronic diary function and a function setup, etc. If it is determined that another person's SIM card is inserted into the MT, the controller 210 determines call history information of call origination or call termination to be the other person's call history information, such that it cannot update call history information of the MT memory 250. A variety of Supplementary Services (SS) menu functions, for example, a call diverting function, a call barring function, a call waiting function, etc., are adapted to allow the user to enter the stored contents. The controller 210 prevents the secondary users from using either multimedia contents such as image and music data stored in the MT memory 250 or the other contents stored by Web or Java programs. The controller 210 has no limitation in call transmission/reception operations.

Figure 6:
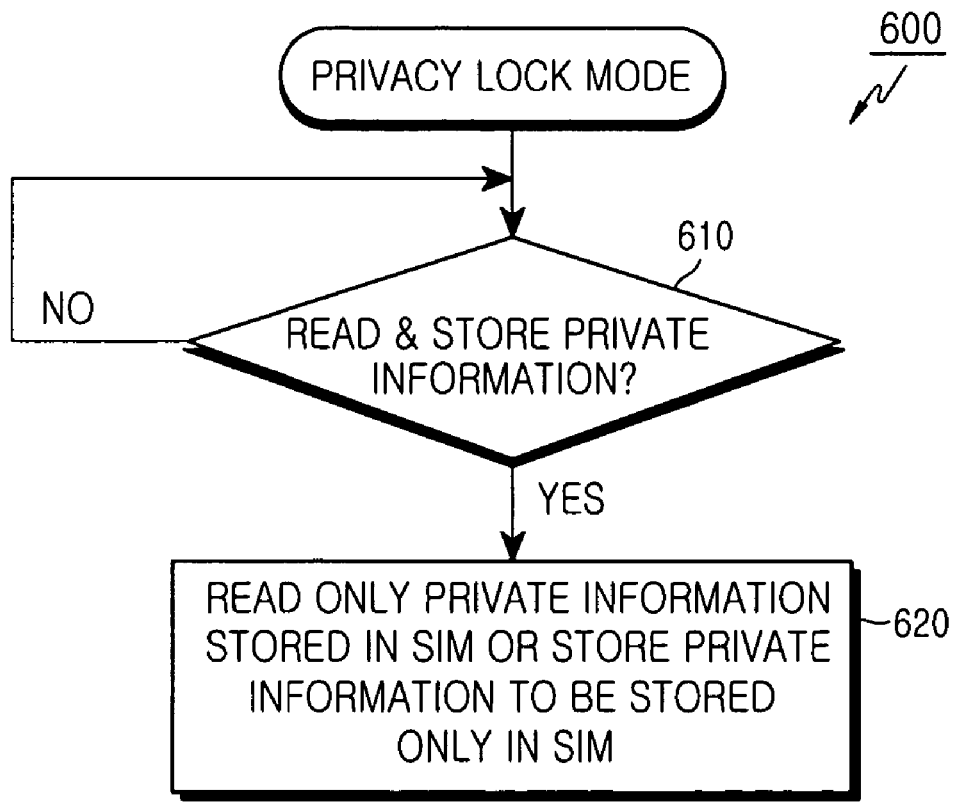
FIGS. 6 and 7 are flow charts illustrating individual methods for controlling the MT in the case of the privacy lock mode in accordance with a preferred embodiment of the present invention.
Figure 7:
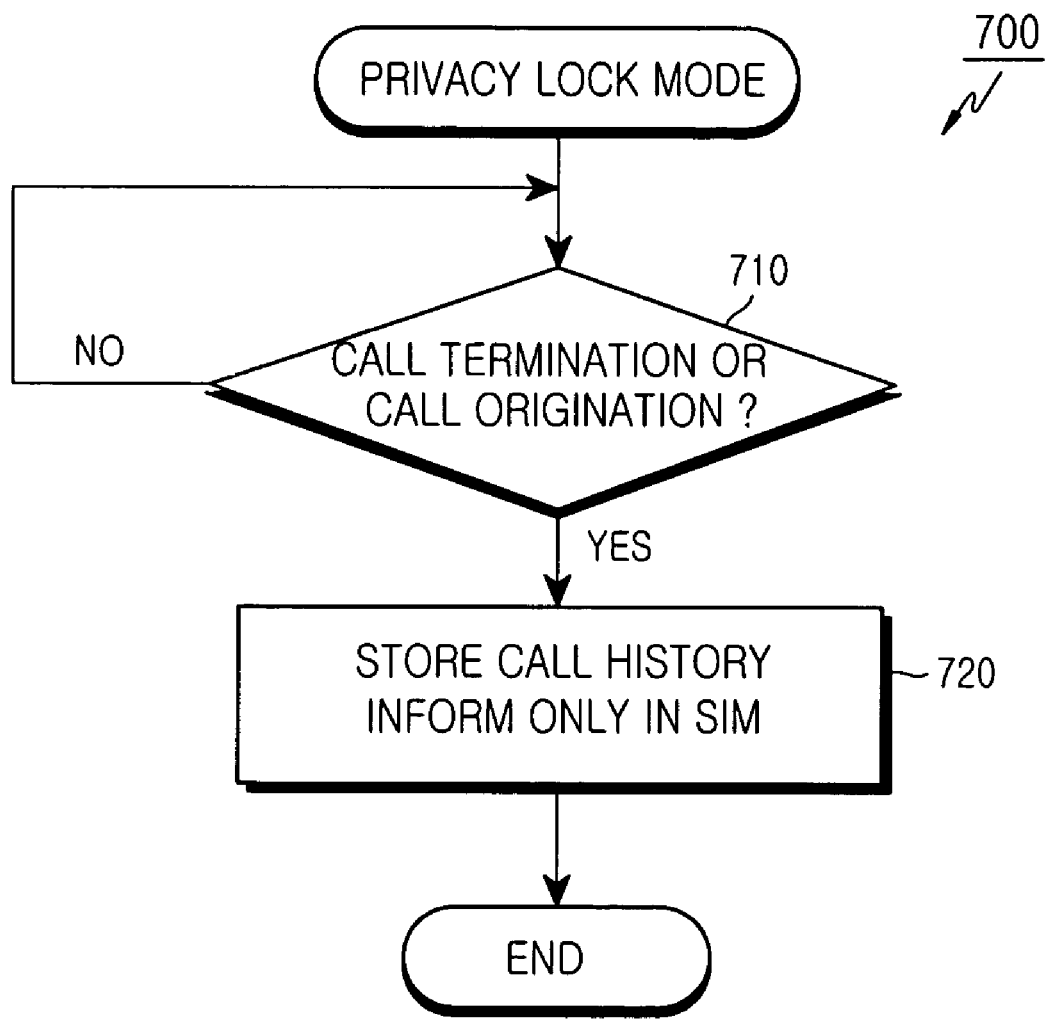

FIGS. 6 and 7 are flow charts illustrating individual methods for controlling the MT in the case of the privacy lock mode in accordance with a preferred embodiment of the present invention.

Referring to FIGS. 2 and 6, in the case of the privacy lock mode, the controller 210 of the MT 200 determines whether the user has commanded the MT 200 to read or store private contents at step 610. In this case, the private contents may be comprised of phone book data, SMS messages, scheduler contents, a variety of function setup contents, and received or downloaded contents. If the user commands the MT 200 to read or store his or her private contents, the controller 210 reads only the private contents stored in the SIM memory 272 or stores the private contents in the SIM memory 272 at step 620.

Referring to FIGS. 2 and 7, in the case of the privacy lock mode, the controller 310 of the MT 200 determines whether either a call origination message or a call termination message is detected at step 710. If it is determined that either the call origination message or the call termination message is detected, the controller 210 stores call history information only in the SIM memory 272 of the SIM card 270 at step 720.

As apparent from the above description, a mobile terminal and a method for controlling the same according to the present invention can prevent people other than the primary user from gaining access to the primary user's private contents stored in the MT even though the primary user permits the others to use his or her MT serving as an ME, resulting in prevention of the unexpected exposure of the primary user's private contents while the primary user's MT is used by the unauthorized users.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A mobile equipment (ME) apparatus for use in a Global System for Mobile communication (GSM) system, comprising:

a Subscriber Identity Module (SIM) card for storing International Mobile Subscriber Identity (IMSI) information used for subscriber authentication and private contents; and a Mobile Terminal (MT) for storing the IMSI and private contents of a primary user, the MT including a controller for reading IMSI information from the SIM card when the SIM card is inserted into the MT and when an attempt is made to access private contents, denying access to the stored private contents of the primary user when the read IMSI information of the inserted SIM card is different from the stored IMSI information and permitting access to the private contents stored in the SIM card, wherein if the IMSI information of the inserted SIM card is different from the IMSI information stored in the MT and an attempt is made to store private contents in the MT, the controller stores the private contents in the SIM card.

2. A method for controlling a Mobile Equipment (ME) comprised of a Subscriber Identity Module (SIM) card for storing International Mobile Subscriber Identity (IMSI) used for user authentication and private contents, and a Mobile Terminal (MT) used for wireless communication, comprising the steps of:

reading the IMSI information of the SIM card, when the SIM card is inserted into the MT;

determining if the read IMSI information of the inserted SIM card is equal to IMSI information stored in the MT;

if the read IMSI information of the inserted SIM card is different from the IMSI information stored in the MT and an attempt is made by a user to access private contents, denying access to private contents stored in the MT and permitting access to the private contents stored in the SIM card; and if the IMSI information of the inserted SIM card is different from the IMSI information stored in the MT and an attempt is made to store private contents in the MT, storing the private contents in the SIM card.

3. The apparatus of claim 1, wherein if the IMSI information of the inserted SIM card is different from the IMSI information stored in the MT and the attempt is made to access the private contents, the controller reads the private contents stored in the SIM card and provides the read private contents to a user.

4. The apparatus of claim 1, wherein the private contents comprises at least one of phone book data, Short Message Service (SMS) messages, scheduler contents, downloaded contents, and call history information.

5. The method of claim 2, further comprising:

if the IMSI information of the inserted SIM card is different from the IMSI information stored in the MT and the attempt is made to access the private contents, permitting the MT to read the private contents stored in the SIM card and to provide the read private contents to the user.

6. The method of claim 2, wherein the private contents include at least one of phone book data, Short Message Service (SMS) messages, scheduler contents, downloaded contents, and call history information.

* * * * *